Patented June 14, 1938

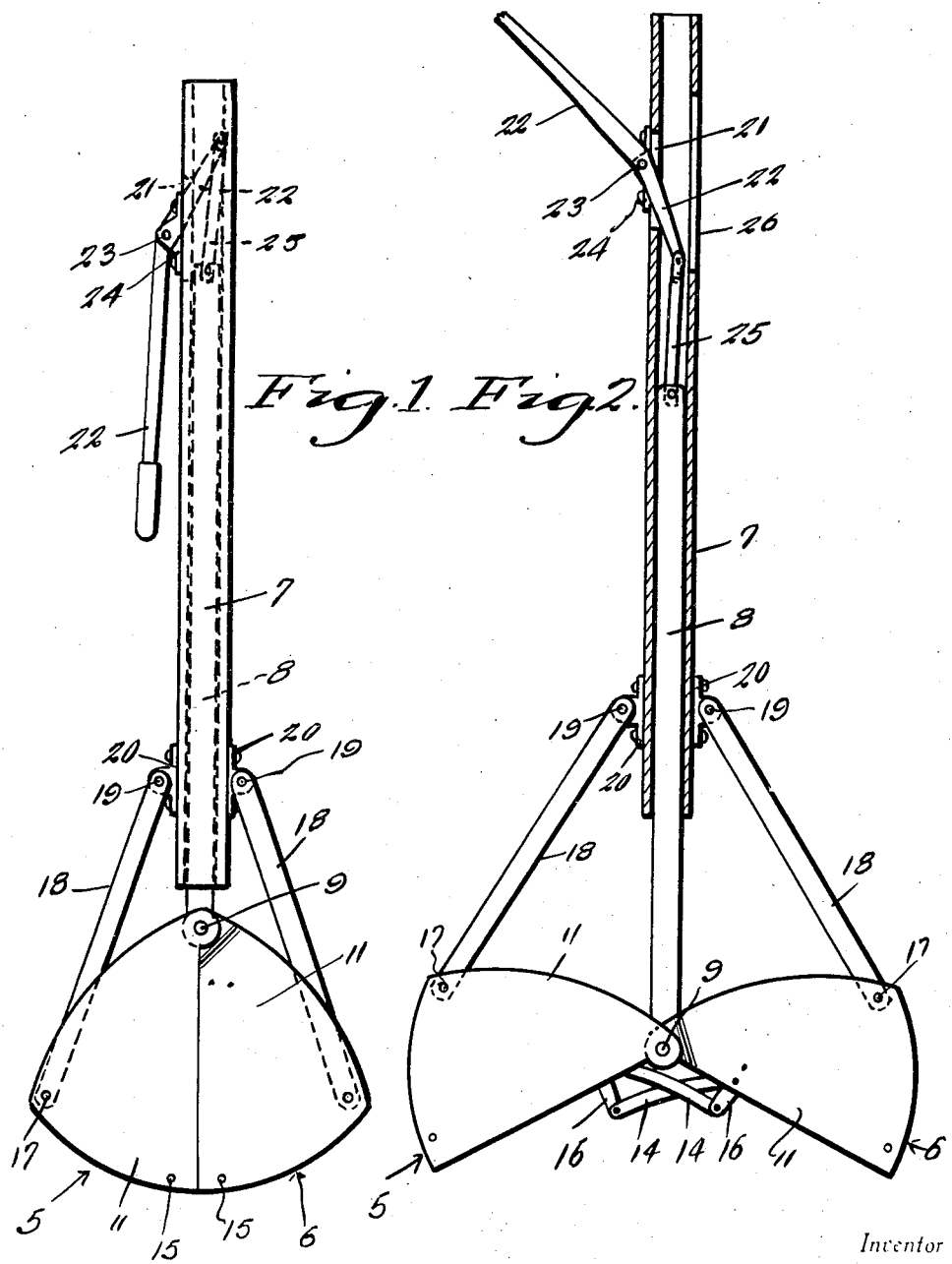

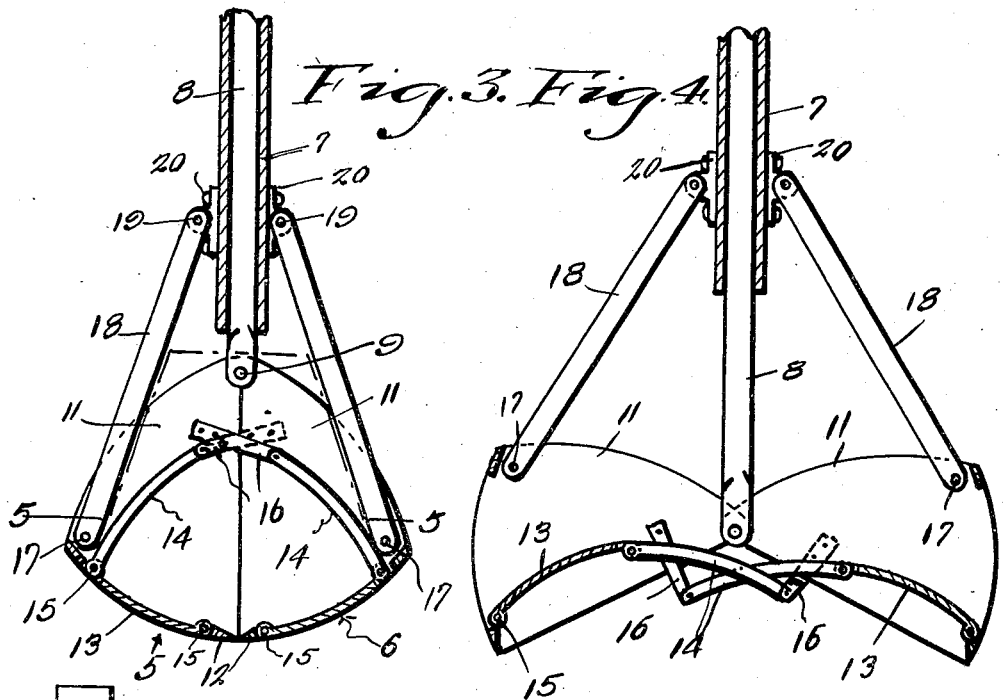
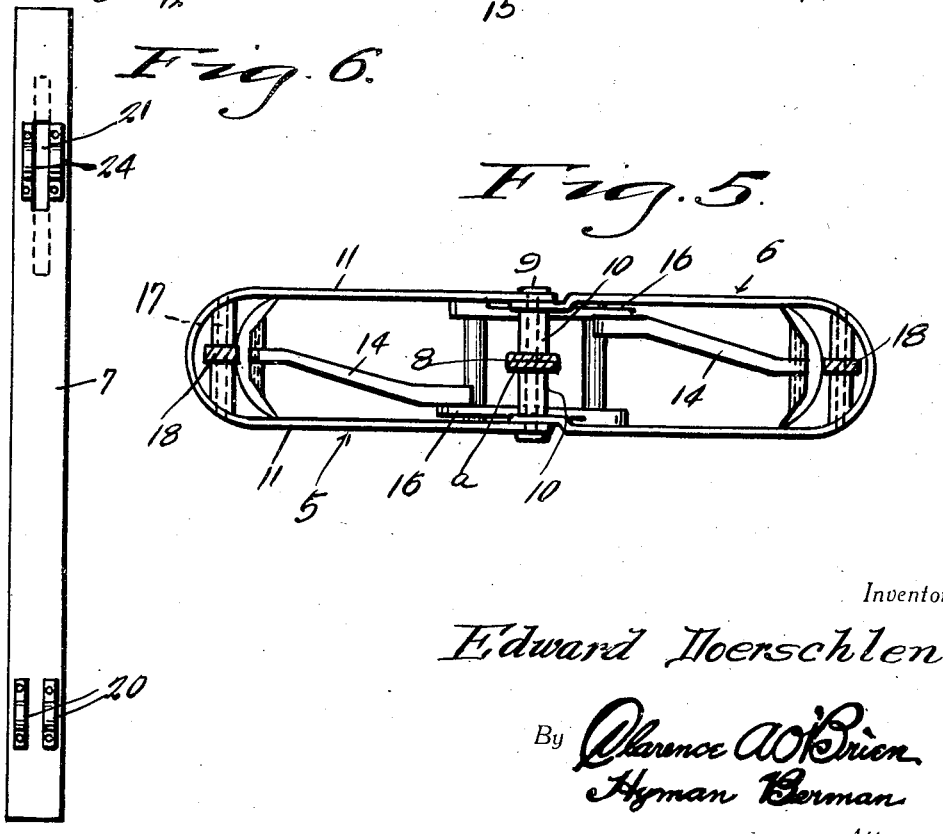

2,120,326

UNITED STATES PATENT OFFICE 2,120,326

DIGGER

Edward Doerschlen, Webster Groves, Mo.

Application July 19, 1937, Serial No. 154,509

2 Claims. (Cl. 37—184)

This invention appertains to new and useful improvements in diggers and more particularly to a digger of the hand operated type.

The principal object of the invention is to provide a digger especially constructed for digging in a convenient manner narrow troughs or ditches in which electric cables or conduits, and gas or waterpipes can be laid.

Another important object of the invention is to provide a digger which is sturdily constructed so that it will not frequently require repair or replacement of parts.

Other important objects and advantages of the invention will become apparent to the reader of the following specification.

In the drawings:—

Figure 1 represents a side elevational view of the digger.

Figure 2 is a side elevational view of the digger showing the shovels in open position and showing the post in section.

Figure 3 is a fragmentary vertical sectional view showing the shovels in closed relation.

Figure 4 is a fragmentary vertical sectional view showing the shovels in open position.

Figure 5 is a cross sectional view taken substantially on the line 5—5 of Figure 3.

Figure 6 is a side elevational view of the post.

Referring to the drawings wherein like numerals designate like parts, it can be seen that the digger includes a pair of shovels generally referred to by numerals 5—6. The digger further includes the tubular post 7 in which the bar 8 is longitudinally slidable. This bar 8 may be of tubular construction and has its lower end flattened as at $a$ and apertured to receive the pivot pin 9 which is disposed through the reduced ends of the side walls of the shovels 5—6. Spacers 10 are provided on the pivot pin 9 at opposite sides of the bar 8 to hold the shovels properly spaced from the said bar.

Each of the shovels 5—6 consists of a pair of side walls 11—11 connected by the sharpened blade member 12. To the inner longitudinal edge of each of these blades 12 is secured the swingable bottom wall 13. Each of these bottom walls 13 has an arcuate arm 14 pivotally secured thereto as at 15. Each of these arms 14 extends and pivotally connects to a lug 16 carried by a side wall 11 of the complementary shovel. Thus it can be seen, that when the shovels 5—6 are moved to the open position shown in Figure 4 the bottom walls 13 move inwardly so as to effectively release earth carried thereby.

Cross members 17 on the shovels 5—6 pass through the lower ends of connecting links 18, these links in turn being pivotally secured as at 19 to the lower portion of the post 7 and within the confines of ears 20 carried by the said post 7.

The upper end portion of the post 7 is provided with the slot 21 through which one end portion of the rockable hand bar 22 extends, the hand bar 22 being fulcrumed as at 23 between the ears 24. A link 25 extends between the inner end of the hand bar 22 and the upper end of the bar 8 and a slot 26 is afforded in the side of the post 7 to accommodate the swing of the inner end portion of the hand bar 22.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:—

1. A digger comprising a pair of shovel members mounted in cooperative relation, manual means for operating the said shovels, each of the said shovels being provided with a swingable bottom and means interconnecting the bottoms so that said bottoms will invert themselves when the shovels are moved to open position.

2. A digger comprising a pair of shovel sections, means for operating the said sections to open or closed position, each of the said shovel sections including a swingable bottom, and connecting means between the bottom of each shovel section and the complementary shovel section so that when the said sections are moved to open position the bottoms will operate independently to invert themselves.

EDWARD DOERSCHLEN.